July 8, 1958  E. S. THOMPSON  2,842,175
STRAW CHOPPER FOR COMBINE
Filed Oct. 24, 1955  2 Sheets-Sheet 1

INVENTOR
E. S. Thompson
BY
ATTYS

July 8, 1958     E. S. THOMPSON     2,842,175
STRAW CHOPPER FOR COMBINE
Filed Oct. 24, 1955     2 Sheets-Sheet 2
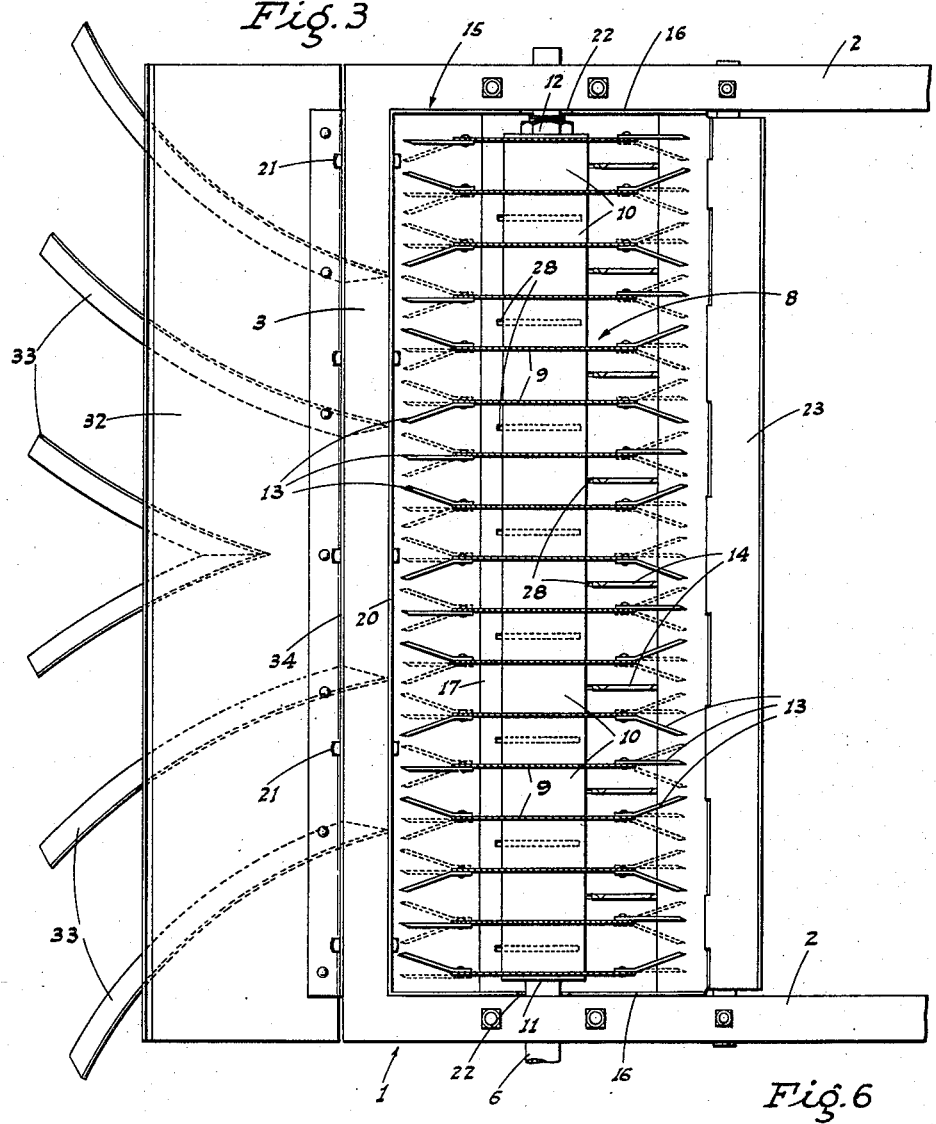
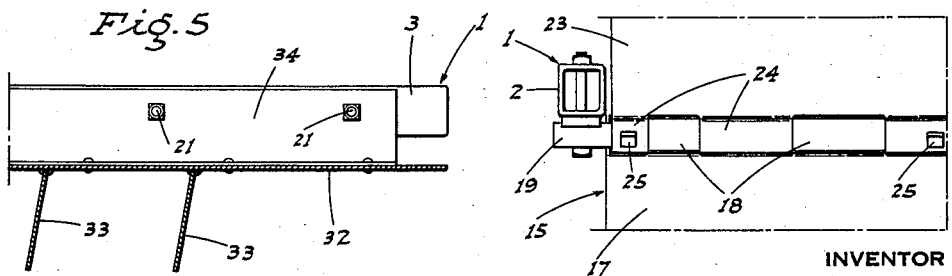
INVENTOR
E. S. Thompson
BY
ATTYS

2,842,175
STRAW CHOPPER FOR COMBINE

Ernest S. Thompson, Strathmore, Calif., assignor to himself and Ethel Thompson, as joint tenants Application October 24, 1955, Serial No. 542,193

4 Claims. (Cl. 146—123)

This invention relates to straw choppers of the type which are mounted on the rear end, straw discharge shrouds of harvesting machines for the purpose of chopping the straw passing through such shrouds; the invention particularly representing improvements over the structure shown in my United States Letters Patent No. 2,626,159, dated January 20, 1953.

The straw chopping unit consists essentially of a bladed rotor, and relatively stationary concave forming blades cooperating with the rotor blades in chopping relation; it being a major object of the present invention to mount the concave forming blades so that they will yield and move out of the way in the event that some relatively hard and unyielding object pass into the chopping unit, and which would otherwise damage the parts thereof.

The concave forming blades include cutting edges facing contra to the direction of rotation of the chopping rotor, and I have found from observation and experimentation that the edges of said concave forming blades should be set at different angles, relative to lines radially of the rotor, for different types of straw. It is therefore another important object of this invention to mount the concave forming blades on the housing of the straw chopper in such a manner that they may be quickly and easily set to dispose the cutting edges of such blades at whatever angle is best suited for the particular type of straw being chopped.

An additional object of the invention is to arrange the blades on the rotor so that they cooperate with the concave forming blades in such a manner that they cover practically the entire space—transversely of the chopper—through which the straw must pass, without requiring the use of an excessively large number of concave forming blades.

It is also an object of the invention to provide a straw chopper which is designed for facility and economy of manufacture; such straw chopper being adaptable for inclusion in a harvester at the time of initial manufacture, or subsequently as an attachment.

Still another object of the invention is to produce a practical, reliable, and durable straw chopper, and one which will be exceedingly effective for the purpose for which it is designed.

These objects are accomplished by means of such structure and relative arrangement of parts as will fully appear by a perusal of the following specification and claims.

In the drawings:

Fig. 3 is a top plan view of the straw chopper, detached, with the rotor blade mounting discs in section, and with the blade shown in somewhat diagrammatic form.

Fig. 5 is a fragmentary transverse section on line 5—5 of Fig. 1.

Fig. 6 is a fragmentary rear end elevation of the straw chopper.

Figure 2:
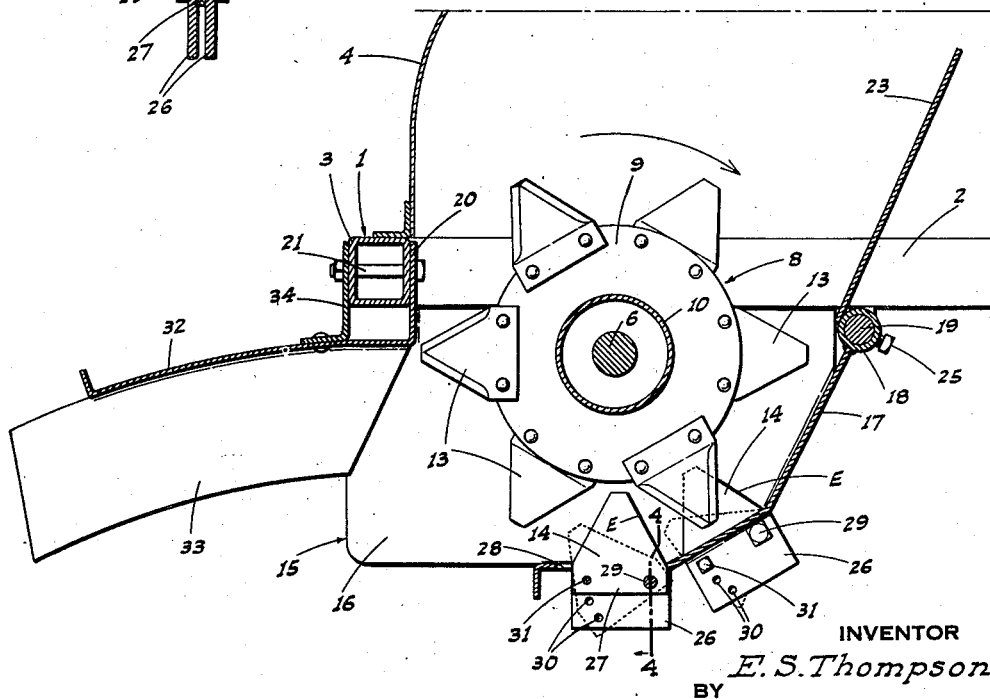
Fig. 2 is a somewhat enlarged sectional elevation of the straw chopper.

Referring now more particularly to the drawings, and to the characters of reference marked thereon, the straw chopper comprises a frame, indicated generally at 1, and which includes side beams 2 and a rear cross beam 3. The beams 2 are arranged to extend along and immediately under the rear-end straw discharge shroud 4 of the harvester 5, with beam 3 just rearwardly of the shroud, as shown in Fig. 2; the beams 2 extending forwardly from the shroud and being secured to the framing of the harvester in any suitable manner.

A transverse shaft 6 is journaled in connection with the beams 2 under the same and between the front and rear end of the shroud 4; said shaft at one end, outside the shroud, having a flywheel and pulley unit 7 thereon adapted to be driven at a somewhat high speed from a suitable one of the driven shafts (not shown) of the harvester.

A rotor, indicated generally at 8, is mounted on the shaft 6 and extends for substantially the full length thereof between the beams 2, or between the sides of the shroud 4.

The rotor 8 comprises a plurality of discs 9 turnably mounted on the shaft 6 and separated by spacers 10 on the shaft. A collar 11 is fixed on the shaft outwardly of one endmost disc, while a nut 12 is mounted on the shaft to engage the other endmost disc, so that all said discs may be clamped against rotation relative to the shaft and to each other, while allowing any disc to slip should it encounter excessive resistance to rotation with the shaft.

Secured on each disc and projecting radially out therefrom are a plurality of blades 13 of generally mower type. The blades 13 on the various discs of the rotor cooperate with a concave therebelow, and which comprises a number of fixed or stationary and generally upstanding blades 14 arranged in relatively close circumferentially spaced rows. The blades of one row are in staggered relation, transversely of the chopper, to the blades of the other row, as indicted in Fig. 3. Also, the various blades 14 are disposed centrally between the different discs 9 of the rotor, as shown.

In order that the rotor blades 13 will as a whole pass closely by the fixed, concave forming blades 14, without the use of an excessive number of such blades 14 in each row, certain ones of the blades 13 of each disc 9 are bent laterally out to one side of said disc, while other blades 13 are bent laterally out to the other side of the disc, as indicated in Fig. 3. As a result of this arrangement, and with the high speed at which the rotor is driven, all straw passing through the chopper is cut into very small pieces or lengths, as is desirable.

The concave forming blades 14 are supported by a housing, indicated generally at 15, which includes side plates 16 covering the rotor 8 at the sides and depending from the frame 1 below the same, and a bottom and rear plate 17 extending downwardly and rearwardly from adjacent the lower edge of beams 2 to a lower edge termination ahead of the forward end of the side plates 16 some instance, as shown in Fig. 2.

At its upper forward end, which is ahead of the rotor 8 a short distance, the plate 17 is rigid with a number of alined but spaced sleeves 18 which turn on a cross shaft 19 fixed at its ends on and under frame beams 2. At its rear end the housing 15 is provided at the top with an upstanding transverse flange 20 which abuts against the forward face of cross beam 3 and is releasably secured thereto by bolts 21 passing horizontally through said beam.

Figure 1:
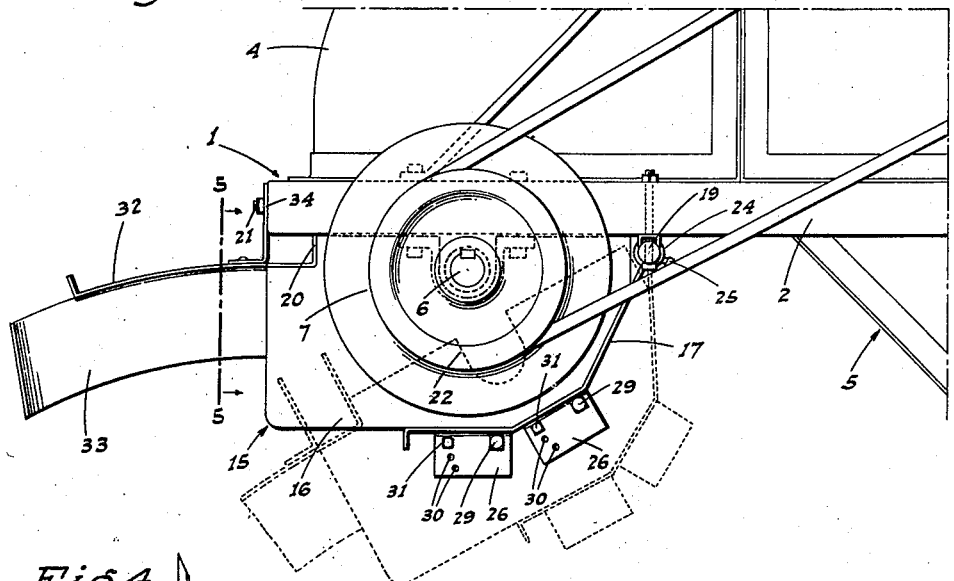
Fig. 1 is a side elevation of the improved straw chopper as mounted on a harvester.
Figure 4:
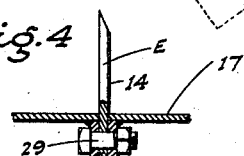
Fig. 4 is a fragmentary enlarged cross section on line 4—4 of Fig. 2.

By reason of this mounting of the housing, upon removal of the bolts 21, said housing and all parts attached thereto, may be swung down about shaft 19 as a hinge; the side plates 16 being recessed at the top, as indicated at 22 in Fig. 1, so as to clear the drive shaft 6. This exposes the rotor 8 from below for inspection or ready removal thereof if necessary without dismantling or removing the housing.

In order that all straw being thrown into the shroud 4 with the operation of the harvester shall be directed to the rotor 8, a baffle or guide plate 23 upstands from shaft 19 at a forward slope, said plate being secured on sleeves 24 turnably engaging said shaft 19 between the sleeves 18 of the housing structure.

The plate 23 is normally held immovable but may be turned on the shaft 19 and set and held at different slopes, as has been found to be the best for different types of straw, by suitable means—here being shown as set screws 25—mounted in certain ones of the sleeves 24 and engaging the fixed shaft 19 in releasable clamping relation.

The concave forming blades 14 are preferably of generally mower type, with one cutting edge E facing contra to the direction of rotation of the rotor 8, and each such blade is individually supported from the plate 17 of the housing 15 in the following manner:

Depending from and secured to plate 17 are bracket plates 26, spaced apart to receive the base 27 of a blade 14 therebetween and disposed on opposite sides of a blade-receiving slot 28 in the plate 17. A relatively heavy pivot or mounting bolt 29 passes through base 27 and the bracket plates 26 adjacent the forward or trailing end of said base.

Adjacent their rear or leading end, the bracket plates 26 are provided with a plurality of holes 30 disposed in a row concentric with bolt 29, and adapted to selectively receive a relatively small locating and shear bolt 31. By reason of this arrangement, any or all of the blades 14 may be adjusted so as to dispose their edges E at different slopes or angles relative to the blades of the rotor or the axis thereof, as the type of straw being handled may determine, so as to obtain the best chopping action under all conditions. At the same time, while bolts 31 are sufficiently strong to hold the blades stationary during all normal chopping operations, they will yield and shear if heavy and relatively uncuttable material should pass into the chopper.

The blades 14 will then drop down through slots 28, turning on their pivot bolts 29 as an axis, and will thus prevent any damage being possibly done to the rotor or the concave as a whole. Any blade 14 thus swung, by an excessive pressure against edge E thereof, will not drop to the ground since the main pivot bolt 29 is strong enough to resist breakage. Such blade will thus remain supported from the chopper, and may be removed for replacement if damaged, or be reset by means of a new shear bolt 31 without material loss of operating time.

In order to properly distribute the chopped straw onto the ground in a wide swath to the rear of the harvester, the housing 15 is provided with a rearwardly projecting hood plate 32, which extends under and relatively close to cross beam 3, and may be connected at its forward end to the lower end of the flange 20. The hood preferably has a downward curve to its rear end.

Secured to and depending from the under side of the hood, and extending rearwardly from the forward end thereof, are transversely spaced deflector vanes 33. These vanes slope laterally out in opposite directions from the center of width of the hood, and are formed with a longitudinal curvature which is concave on the outwardly projecting faces of the vanes, as shown in Fig. 3. Also, the vanes are set with an inward slope to their lower edge, as shown in Fig. 5. By reason of this arrangement the chopped straw, being thrown rearwardly from within the housing by the rotor action, is caught by the hood 32, and is then deflected laterally out and down by the curved and inwardly sloping faces of the vanes 33. In this manner, the finely chopped matter is thrown over a wide area onto the ground to the rear of the forwardly moving harvester.

The hood 32 is braced from the frame beam 3 by an upstanding flange 34 secured to the hood and engaging the rear face of the beam 3, and detachably secured thereto by the bolts 21, so that removal of said bolts releases the flange 34 as well as flange 20. This enables the casing, hood, and vanes to be lowered as a unit.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In a harvester which includes a downwardly opening shroud at its rear end and into which straw from the operation of the harvester is delivered, a straw-chopping unit mounted below the shroud over the opening thereof and including a transverse horizontal-axis rotor having radially projecting straw chopping blades, a housing in which the rotor below the shroud is enclosed, and a concave in the housing below the rotor to cooperate with the blades thereof; said concave including a row of upstanding blades each having a cutting edge facing contra to the direction of rotation of the rotor, and means mounting the concave blades on the housing so that each blade may be set independently of the other blades with said edge thereof disposed at varying angles to a vertical plane; said means comprising, for each concave blade, brackets secured on and depending from the housing and between which the base portion of the blade projects, the housing being slotted between the brackets for the reception of the blades, a pivot bolt through said base portion and the brackets adjacent one end thereof, the bracket having a row of holes spaced from and concentric with said pivot bolt, and another bolt removably extending through said base portion and any selected one of said row of holes.

2. In a harvester which includes a downwardly opening shroud at its rear end and into which straw from the operation of the harvester is delivered, a straw-chopping unit mounted below the shroud over the opening thereof and including a transverse horizontal-axis rotor having radially projecting straw chopping blades, a housing in which the rotor below the shroud is enclosed, and a concave in the housing below the rotor to cooperate with the blades thereof; said concave including a row of upstanding blades, and means mounting the concave blades on the housing independently of each other and so that any such blade may yield downwardly upon excess pressure being exerted thereon in the direction of rotation of the rotor without disturbing the other blades; said means comprising, for each concave blade, brackets secured on and depending from the housing and between which the base portion of the blade projects, the housing being slotted between the brackets for the reception of the blades, a main pivot bolt through the brackets and the base portion of the blades adjacent the trailing end thereof, and a shear bolt through the brackets and said base portion of the blade adjacent the leading end thereof.

3. In a harvester which includes a downwardly opening shroud at its rear end and into which straw from the operation of the harvester is delivered, a straw-chopping unit mounted below the shroud over the opening thereof and including a transverse horizontal-axis rotor and a cooperating concave below the rotor; and an upstanding baffle plate mounted on the unit and projecting upwardly into the shroud adjacent but ahead of the rotor to direct and guide straw entering the shroud to the rotor, and means mounting the baffle plate on the unit for swinging movement of said baffle plate about its lower end as an axis for adjustable setting of said plate relative to a vertical plane; said means comprising a transverse shaft supported on the harvester, sleeves on the lower end of the baffle plate turnably engaging the shaft, and shaft engaging set screws on certain ones of said sleeves exposed for operation exteriorly of the shroud.

4. In a harvester which includes a downwardly opening shroud at its rear end and into which straw from the operation of the harvester is delivered, a straw-chopping unit mounted below the shroud and including a frame secured on the harvester below the shroud and having side beams extending along the sides of the shroud, a transverse horizontal-axis straw chopping rotor mounted on the beams and extending over the shroud opening, a housing enclosing the rotor below the shroud, a concave mounted in the housing below the rotor and cooperating therewith in straw chopping relation, a transverse shaft secured on the under side of the frame beams at the forward end of the housing, spaced sleeves fixed with the housing and turnable on the shaft, and means between the frame and the opposite end of the housing to releasably hold the latter in place relative to the frame, a baffle plate upstanding from the housing into the shroud from adjacent the shaft, sleeves on the baffle plate turnably engaging the shaft between the first named sleeves, and means releasably clamping the last named sleeves against rotation on the shaft.

References Cited in the file of this patent

UNITED STATES PATENTS

| | | |
|---|---|---|
| 999,932 | Wetterhold | Aug. 8, 1911 |
| 1,191,853 | Thompson | July 18, 1916 |
| 1,211,566 | Fortney | Jan. 9, 1917 |
| 2,213,906 | Ebersol | Sept. 3, 1940 |
| 2,298,830 | McGillis | Oct. 13, 1942 |
| 2,573,129 | Dulait | Oct. 30, 1951 |
| 2,611,407 | Alloway | Sept. 23, 1952 |
| 2,626,159 | Thompson | Jan. 20, 1953 |
| 2,670,775 | Elofson | Mar. 2, 1954 |
| 2,708,582 | Adams | May 17, 1955 |
| 2,754,126 | Aune | July 10, 1956 |